United States Patent

[11] 3,596,345

[72] Inventor Everett O. Nord
 Aurora, Colo.
[21] Appl. No. 865,905
[22] Filed Oct. 13, 1969
[45] Patented Aug. 3, 1971
[73] Assignee High Country Enterprises, Inc.
 Aurora, Colo.

[54] METHOD AND MEANS FOR PREINSTALLING SPRINKLER HEADS AND FITTINGS IN PLASTIC PIPE FOR SPRINKLER SYSTEMS
8 Claims, 3 Drawing Figs.
[52] U.S. Cl.................................................... 29/429,
 29/200
[51] Int. Cl..................................................... B23p 19/00
[50] Field of Search............................................ 29/429,
 430, 431, 200, 200 B

[56] References Cited
UNITED STATES PATENTS
3,350,769  11/1967  Berry............................ 29/431

Primary Examiner—Thomas H. Eager
Attorney—R. H. Galbreath

ABSTRACT: Plastic pipe is thermally softened and withdrawn from a supply roll and impelled through a straight elongated guide trough provided with a measurement scale. Sprinkler heads and pipe fittings are fabricated in the trough-contained pipe at points indicated on the measurement scale which are determined by study of a presubmitted plan. The pipe with its installed heads and fittings in place is reeled and delivered as a unit to an installer for burial in the ground to provide a complete lawn sprinkling system.

PATENTED AUG 3 1971 3,596,345
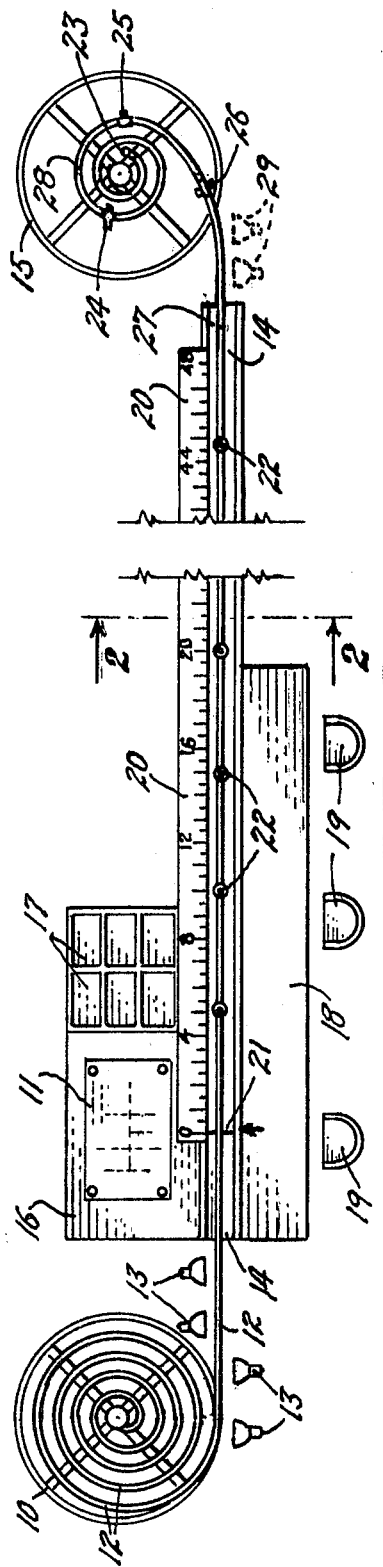
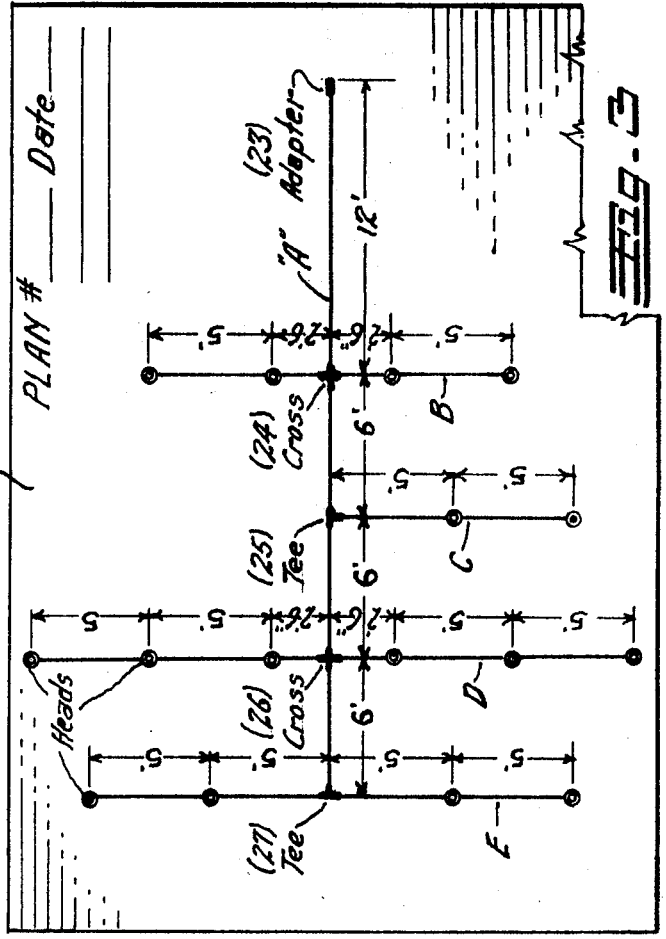
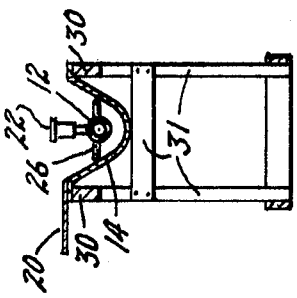
INVENTOR.
EVERETT O. NORD
BY
*D. H. Galbreath*
ATTORNEY

METHOD AND MEANS FOR PREINSTALLING SPRINKLER HEADS AND FITTINGS IN PLASTIC PIPE FOR SPRINKLER SYSTEMS

This invention relates to buried lawn sprinkling systems of the type in which a plurality of sprinkler heads are strategically positioned in relatively large lawn areas and supplied with water by means of buried plastic pipes. Such a system is usually installed piecemeal, that is, the plastic pipe is laid upon the lawn and the sprinkler heads and pipe fittings, such as nipples, elbows, tees and crosses are individually and successively installed and the required connections in and between the main and branch lines are successively made in the field as the installation progresses. The result is a slow, tedious and inefficient installation, since the pipe cutting and fabrication work must be on done on the ground away from a work bench and away from efficient, power driven shop tools, and since the various pipe lengths, the sprinkler heads, the pipe fittings and other equipment and supplies must be carried over the entire work area so as to be accessible for the required field work.

The principal object of the present invention is to provide a method and means which will enable complete, assembled lawn sprinkler systems and assembled component parts thereof to be delivered ready for installation in response to submitted drawings or plans of proposed lawn areas so as to eliminate or substantially reduce the time consuming troublesome and inefficient detailed field work usually required.

A further object is to provide a central sprinkler system plant or shop to which lawn sprinkler installers or do-it-yourself home owners may submit lawn plans and receive in return a continuous length of coiled plastic pipe with all of the required sprinkler heads and pipe fittings mounted in correct position thereon and with all of the points for cutting accurately indicated thereon, so that the pipe can be quickly and easily placed in the conventional pipe receiving trenches with a minimum of field work.

Other objects and advantages reside in the detail construction of the invention, which is designed for simplicity, economy, and efficiency. These will become more apparent from the following description.

In the following detailed description of the invention, reference is made to the accompanying drawing which form a part hereof. Like numerals refer to like parts in all views of the drawing and throughout the description.

In the drawing:

FIG. 1 is a diagrammatic, fragmentary plan view of a central sprinkler system plant or shop showing the type, position and arrangement of equipment therein for furnishing preassembled pipe lengths for sprinkler systems;

FIG. 2 is an enlarged detail cross section taken on the line 2-2, FIG. 1; and

FIG. 3 is a still further enlarged view of a specimen shop plan of the type which is submitted to the shop of FIG. 1 for the preassembly of the pipe lines for a particular sprinkler system.

Referring to FIG. 1 it will be seen that the shop equipment includes a horizontal, rotatably mounted feed pipe reel 10, designed to receive a conventional coil 12 of plastic pipe. A plurality of conventional infrared heaters 13 are mounted adjacent the outgoing extremity of the coil 12 to heat the pipe so that it may be straightened and directed into, and pushed along a straight horizontal guide trough 14 which extends lengthwise of the shop and discharges the fabricated pipe to a horizontal rotatable finished system reel 15.

The trough 14 may have any suitable construction. One such construction is illustrated in FIG. 2 in which the trough 14 is formed of an elongated strip of sheet metal having a U-shaped cross section attached between longitudinal supporting stringers 30 which are in turn supported upon suitable spaced apart leg frames 31. The strip may be of any desired length depending upon the longitudinal space available in the particular shop.

A plan board 16 and a plurality of equipment bins 17 are positioned along the far side of the entrance extremity of the guide trough 14 and an elongated workbench 18 is positioned along the near side of the entrance extremity so as to be accessible to workmen positioned on suitable workment's seats 19. A measurement scale 20 is permanently mounted along the far side of the trough 14 which indicates foot and inch distances from a zero mark 21 in the trough at the workbench 18.

It is thought best to describe the functions of the above equipment by following the progress of a relatively simple sample sprinkler system through the shop. Therefore, let us assume that a system plan 11, such as shown in FIG. 3, is mounted upon the plan board 16 before the workmen so as to direct the progress of the work. The selected plan discloses a main pipe "A" provided with suitable fittings for feeding a plurality of branch pipes "B," "C," "D" and "E," to which suitable sprinkler heads 22 are to be applied in spaced relation. The plan also shows the distances between the fittings and between the heads and the indicated distances are used in the following description of the operation.

The operation is started by drawing the thermally softened pipe from the reel 10 into the guide trough 14 and applying a commercial adapter fitting 23 to the extremity thereof as indicated on the system plan 11. The pipe is then pushed forwardly, to the right in FIG. 1, until the adapter fitting 23 reaches the 12-foot mark on the measurement scale 20. A cross fitting 24 is now selected from the bins 17 and installed in the pipe at the zero mark 21 to receive the branch pipe "B" as indicated on the plan 11. The pipe is again pushed forwardly until the adapter fitting 23 reaches the 18-foot indication on the scale 20 and a T-fitting 25 is selected from the equipment bins 17 and installed at the zero mark 21 to receive the branch pipe "C." The pipe is now similarly pushed forward 6 feet on the scale 20 and a second cross fitting 26 is selected and installed at the zero mark 21 to receive the branch pipe "D." A final advancement of 6 feet is now made and the main pipe is marked for subsequent cutting at the zero mark, as indicated at 27, to connect with the T-fitting shown in the branch pipe "E" on the plan. The advancement of the pipe is continued and the branch pipes "B," "C," "D" and "E" are now successively prepared similarly to the above description with reference to the main pipe "A." That is, the sprinkler heads 22 and the necessary fittings are installed therein and the necessary cut marks, similar to the cut mark 27, are made thereon at the indicated distances as indicated on the plan 11.

As the pipe moves forwardly, it is continuously reeled upon the completed system reel 15. The final result is a coil 28 of a continuous length of pipe, which represents all of the pipes of the system, with the sprinkler heads, fittings, cut marks, etc. properly positioned thereon. The finished coil 28 is delivered as a unit to the installer together with the submitted plan and the coil. The finished coil can be easily carried and quickly unrolled into the conventional receiving trenches on the lawn job with the majority, if not all, the tedious, expensive, time consuming detail field labor eliminated.

The fittings and the heads may be of any of the conventional standard varieties. Coils of differing diameter pipe can be quickly interchanged on the feed pipe reel 10 to comply with required instructions on the plan board 16.

Ordinarily the pipe moves sufficiently rapid through the guide trough to retain its pliability so that it may be readily recoiled in the finished system reel 15 without reheating. Should conditions require it, additional infrared heaters may be positioned at the discharge extremity of the trough as indicated in broken line at 29.

The plan 11 is simply illustrative of the operation since all of the future plans will be different to suit the layout of particular proposed sprinkler systems. The cutting marks 27 may be painted on or notched in the pipe for future location.

While the invention has been described, and is particularly useful with plastic pipe, it may also be of value with any pipe capable of being coiled and uncoiled and while the elements 22 have for convenience been referred to as "sprinkler heads" they could be nipples or other fittings to which conventional sprinkler heads could be later attached.

While a selected form of the invention has been above described, it is understood that mechanical variations and detail substitutions can be made by one skilled in the art without departing from the spirit of the invention.

Having thus described the invention what I claim and desire to be secured by Letters Patent is:

1. Means for prepositioning sprinkler heads and fittings in plastic pipe for use in lawn sprinkler systems including:
   a. a horizontally extending elongated guide trough having an entrance extremity and a discharge extremity;
   b. unreeling means for rotatably supporting a coil of pipe at the entrance extremity of said guide trough so that the pipe can be withdrawn from said coil and directly passed longitudinally through said trough to the discharge extremity thereof; and
   c. measuring means positioned alongside said guide trough for locating positions on said pipe within said trough for the installation of sprinkler heads and fittings thereon.

2. Means for prepositioning sprinkler heads and fittings in plastic pipe as described in claim 1 in which the measuring means comprises:
   a. a foot and inch scale fixedly positioned at one side of and extending longitudinally of said trough from a zero marking adjacent the entrance extremity of said trough.

3. Means for prepositioning sprinkler heads and fittings in plastic pipe as described in claim 2 having:
   a. means for supporting a sprinkler system plan adjacent said entrance extremity and at one side of said trough, said plan giving the distances to be read from said scale for locating said positions.

4. Means for prepositioning sprinkler heads and fittings in plastic pipe as described in claim 3 having:
   a. an elongated workbench positioned along the other side of said trough adjacent the entrance extremity for the convenience of workmen installing sprinkler heads and fittings at said located positions.

5. Means for prepositioning sprinkler heads and fittings as described in claim 4 having:
   a. storage means for sprinkler heads and fittings adjacent said entrance extremity.

6. Means for prepositioning sprinkler heads and fittings as described in claim 4 having:
   a. means for heating said pipe as it passes from said coil to said trough to enable it to be straightened into alignment with said trough.

7. Means for prepositioning sprinkler heads and fittings as described in claim 4 having:
   a. pipe reeling means positioned adjacent said discharge extremity of said trough for receiving and coiling the pipe and its prepositioned sprinkler heads and fittings for delivery.

8. A method for fabricating a sprinkler system of the type having sprinkler heads positioned above and in spaced relation along buried plastic pipe comprising:
   a. preparing a plan of said system, said plan indicating the position and spacing of said heads;
   b. withdrawing a length of said pipe from a circular coil thereof and straightening said length by passing it lengthwise through a stationary, straight guide trough; and
   c. installing sprinkler heads in spaced relation along said length in accord with the indications on said plan while the pipe is supported in said trough; thence
   d. coiling the pipe with the sprinkler heads in place thereon for delivery to, and installation in, a lawn sprinkler system.